W. S. EDWARDS.
STRETCHING DEVICE FOR LAWN TENNIS NETS.
APPLICATION FILED NOV. 14, 1911.
1,023,928.
Patented Apr. 23, 1912.
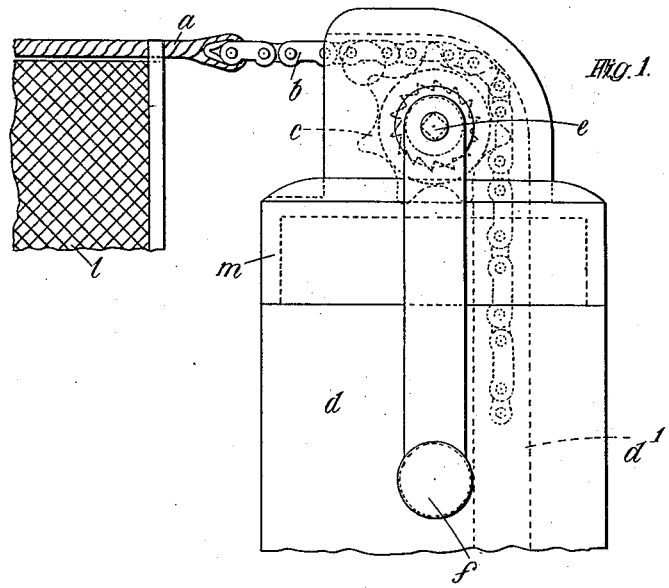
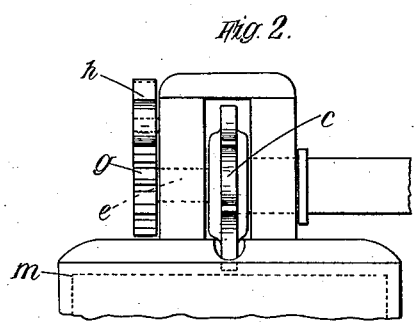
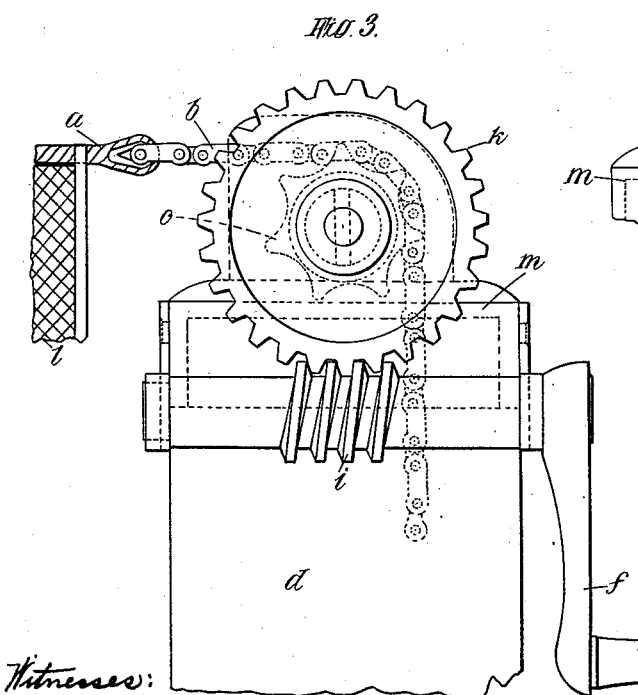
Witnesses:
M. E. Shook
Allan Hobson
Inventor:
William Saunders Edwards,
By Edson Bros, attorneys.

UNITED STATES PATENT OFFICE.

WILLIAM SAUNDERS EDWARDS, OF BRIDPORT, ENGLAND.

STRETCHING DEVICE FOR LAWN-TENNIS NETS.

1,023,928.  Specification of Letters Patent.  Patented Apr. 23, 1912.

Application filed November 14, 1911. Serial No. 660,239.

*To all whom it may concern:*

Be it known that I, WILLIAM SAUNDERS EDWARDS, a subject of the King of Great Britain, residing at "The Gables" and St. Michael's Net Works, Bridport, in the county of Dorset, England, have invented certain new and useful Improvements in or Relating to Stretching Devices for Lawn-Tennis Nets, of which the following is a specification.

This invention relates to apparatus for supporting lawn tennis nets and the like, the chief object being to enable the nets to be raised and lowered in a more satisfactory and efficient manner than has hitherto been possible.

The apparatus ordinarily employed for raising tennis nets comprises a reel mounted in a slot formed in the upper part of the usual tennis post, and mechanism, including a handle capable of causing the tennis line to be wound up on the reel and then be held in its taut condition. As the line is being wound up on the reel, it often accumulates upon the reel to such an extent that it becomes jammed in the space allotted to it; the arrangement consequently not only prevents further winding of the line, but the latter becomes frayed or otherwise damaged and is prematurely rendered useless for its purpose.

According to the present invention, the tennis line is pulled taut to the requisite degree without being itself brought into actual contact with the winding mechanism employed and without causing any accumulation of line upon this mechanism. For this purpose the line may be provided with an extension in the form of a chain, and the winding mechanism may comprise a toothed wheel for engagement with the chain.

In order that the said invention may be clearly understood and readily carried into effect, I will proceed to describe the same with reference to the accompanying drawings, in which:—

Figure 1 is a side elevation, and Fig. 2 an end view illustrating one form of tensioning device according to this invention. Fig. 3 is an elevation illustrating another form of the said device.

The line $a$ is provided with a chain extension $b$ which engages with the toothed wheel $c$ mounted on or near the head of the usual post $d$. The spindle $e$ is provided with a handle $f$ for turning the toothed wheel or sprocket $c$. Means are provided to prevent the wheel $c$ from running backward, and thereby letting out the tennis line, after the line has been strained to the desired degree of tautness; such means may for instance comprise a ratchet wheel $g$ and pawl $h$ as shown in Fig. 2, or the ratchet and pawl may be dispensed with and the necessary locking be obtained by means of a worm $i$ and worm wheel $k$ (Fig. 3) interposed between the wheel $c$ and its handle $f$; or a movable stop or pin may be provided for engagement with a tooth or other part of the wheel $c$, in which case the handle may be mounted directly on the axle of the wheel. The chain need engage with a part only of the periphery of the wheel $c$, and the slack part of the chain, that is to say, the part beyond the wheel, may hang loose, a recess or pocket $d'$ (Fig. 1) being preferably made in the post $d$ to receive it.

To raise the net $l$ to the requisite height, the handle $f$ is rotated in the proper direction; the chain $b$ is drawn by the toothed wheel $c$ and a certain length travels past it in proportion to the amount of slackness taken up in the line $a$. If the worm and worm wheel as shown in Fig. 3 are used, the parts will automatically remain in position when the handle $f$ is released, otherwise the pin or stop is moved into a position to engage with the wheel and thereby prevent its backward rotation, or the aforesaid ratchet and pawl serve the same purpose. The part of the chain that passes the toothed wheel hangs loosely outside the post or as shown in a recess formed in the post. It is to be observed that there is no possibility of obstruction to the winding action through accumulation of line or chain, and that the line is not damaged in any way, since it does not come into contact with the winding mechanism.

Although, in Fig. 3, the worm and handle are shown below the worm wheel and the sprocket wheel shaft, it will be obvious that the same effect may be obtained by arranging the worm and handle above the worm wheel or in any other position relatively to the latter. It will also be obvious that the gearing may be inclosed in the cap the latter being arranged or constructed in accordance with requirements.

For the purpose of enabling the above described winding mechanism to be applied to posts already manufactured the toothed wheel and its bearings may conveniently be carried upon a cap-like base such as indicated at *m* capable of being attached to the upper end of the post *d* by screws or the like. In any case, however, the winding mechanism may be mounted in this way, the base being formed as a metal casting with a socket portion or with lugs for receiving or engaging with the upper end of the post.

What I claim and desire to secure by Letters Patent of the United States is:—

1. Apparatus for supporting lawn tennis nets and the like comprising a line, an extension on said line, a toothed wheel engaging with said extension, means for rotating said wheel and a device for preventing said wheel running back after the tension of the line has been adjusted to the desired degree.

2. Apparatus for supporting lawn tennis nets and the like comprising a line, a chain secured to the extremity of said line, a sprocket wheel for engaging said chain, means for rotating said wheel and a ratchet and pawl mechanism for preventing said sprocket running back after the tension of the line has been adjusted to the desired degree.

3. Apparatus for supporting lawn tennis nets and the like comprising a line, a chain secured to the extremity of said line, a sprocket wheel engaging with said chain, a worm gearing associated with said sprocket wheel and a handle for operating said worm gearing and imparting a rotary motion to the sprocket wheel.

In testimony whereof I affix my signature in presence of two witnesses.

WILLIAM SAUNDERS EDWARDS.

Witnesses:
F. J. RAPSON,
T. S. EDWARDS.

---

Copies of this patent may be obtained for five cents each, by addressing the "Commissioner of Patents, Washington, D. C."